(12) United States Patent
Wysocki et al.

(10) Patent No.: US 9,335,502 B1
(45) Date of Patent: May 10, 2016

(54) FIBER OPTIC CABLE ARRANGEMENT

(71) Applicants: Paul F. Wysocki, Blacksburg, VA (US); Christopher H. Lambert, Blacksburg, VA (US); Juan P. Franco, Blacksburg, VA (US); Carl W. Stoesz, Blacksburg, VA (US); Brooks A. Childers, Christiansburg, VA (US)

(72) Inventors: Paul F. Wysocki, Blacksburg, VA (US); Christopher H. Lambert, Blacksburg, VA (US); Juan P. Franco, Blacksburg, VA (US); Carl W. Stoesz, Blacksburg, VA (US); Brooks A. Childers, Christiansburg, VA (US)

(73) Assignee: BAKER HUGHES INCORPORATED, Houston, TX (US)

( * ) Notice: Subject to any disclaimer, the term of this patent is extended or adjusted under 35 U.S.C. 154(b) by 0 days.

(21) Appl. No.: 14/577,840

(22) Filed: Dec. 19, 2014

(51) Int. Cl.
*G02B 6/44* (2006.01)
*G01L 1/24* (2006.01)

(52) U.S. Cl.
CPC .............. *G02B 6/443* (2013.01); *G01L 1/243* (2013.01); *G02B 6/4427* (2013.01); *G02B 6/4434* (2013.01)

(58) Field of Classification Search
CPC ..... G01L 1/242–1/245; G02B 6/4407–6/4408; G02B 6/443; G02B 6/4434; G02B 6/4427
See application file for complete search history.

(56) References Cited

U.S. PATENT DOCUMENTS

| | | | |
|---|---|---|---|
| 3,717,719 A | 2/1973 | Smith et al. | |
| 4,265,690 A | 5/1981 | Lowenhar | |
| 4,755,037 A | 7/1988 | Bjornlie et al. | |
| 4,836,872 A | 6/1989 | Landry et al. | |
| 5,274,725 A | 12/1993 | Bottoms, Jr. et al. | |
| 5,344,511 A | 9/1994 | Graefe et al. | |
| 5,509,097 A | 4/1996 | Tondi-Resta et al. | |
| 5,514,080 A | 5/1996 | Blott et al. | |
| 5,848,212 A | 12/1998 | Wagman | |
| 6,004,639 A | 12/1999 | Quigley et al. | |
| 6,191,414 B1 | 2/2001 | Ogle et al. | |
| 6,324,323 B1 | 11/2001 | Benham | |
| 6,431,767 B2 | 8/2002 | Nagasaki | |
| 6,457,533 B1 | 10/2002 | Metcalfe | |
| 6,874,361 B1 | 4/2005 | Meltz et al. | |
| 7,013,979 B2 | 3/2006 | Richard | |
| 7,252,437 B2 | 8/2007 | Ringgenberg | |
| 7,318,481 B2 | 1/2008 | Richard | |
| 7,644,773 B2 | 1/2010 | Richard | |
| 7,708,073 B2 | 5/2010 | Richard | |
| 7,792,405 B2 | 9/2010 | Stoesz et al. | |
| 7,903,695 B2 | 3/2011 | Kojima et al. | |
| 7,954,560 B2 | 6/2011 | Mathiszik et al. | |
| 7,983,520 B2 | 7/2011 | Bringuier et al. | |
| 8,111,952 B2 | 2/2012 | Herbst | |
| 8,191,225 B2 | 6/2012 | Richard | |

(Continued)

FOREIGN PATENT DOCUMENTS

| | | | |
|---|---|---|---|
| GB | 2020085 A | 11/1979 | |
| JP | 6148440 A | 5/1994 | |

(Continued)

OTHER PUBLICATIONS

D.S. McKeehan et al., "Marine Applications for a Continuous Fiber-Optic Strain-Monitoring System, Part II"; Offshore Technology Conference; OTC 5564; Apr. 27, 1987; 10 pages.

(Continued)

*Primary Examiner* — Jerry Rahll
(74) *Attorney, Agent, or Firm* — Cantor Colburn LLP (57) ABSTRACT

A fiber optic cable arrangement includes a core, a sheath surrounding the core and being strain locked to the core, and at least one optical fiber positioned within the sheath being strain locked to the core.

15 Claims, 7 Drawing Sheets

(56) References Cited

U.S. PATENT DOCUMENTS

| | | |
|---|---|---|
| 8,292,803 B2 | 10/2012 | Watanabe |
| 8,326,103 B2 | 12/2012 | Stoesz et al. |
| 8,443,888 B2 | 5/2013 | Coronado |
| 8,684,075 B2 | 4/2014 | Guest et al. |
| 8,973,434 B2 | 3/2015 | Albrecht et al. |
| 2002/0006254 A1 | 1/2002 | Nagasaki |
| 2002/0076189 A1 | 6/2002 | McMullin et al. |
| 2002/0129935 A1 | 9/2002 | Castano-Mears et al. |
| 2002/0131727 A1 | 9/2002 | Reedy et al. |
| 2002/0178582 A1 | 12/2002 | Echols et al. |
| 2003/0138234 A1 | 7/2003 | Yong |
| 2004/0035590 A1 | 2/2004 | Richard |
| 2004/0060695 A1 | 4/2004 | Castano-Mears et al. |
| 2004/0062497 A1 | 4/2004 | Plemmons et al. |
| 2004/0071416 A1 | 4/2004 | Militaru |
| 2004/0252954 A1 | 12/2004 | Ginocchio et al. |
| 2005/0173130 A1 | 8/2005 | Richard |
| 2005/0205263 A1 | 9/2005 | Richard |
| 2005/0276551 A1 | 12/2005 | Brown et al. |
| 2006/0015014 A1 | 1/2006 | Remijan et al. |
| 2006/0182398 A1 | 8/2006 | Dowd et al. |
| 2008/0271926 A1 | 11/2008 | Coronado et al. |
| 2008/0310803 A1 | 12/2008 | Franke et al. |
| 2009/0034903 A1 | 2/2009 | Herbst |
| 2009/0223678 A1 | 9/2009 | Richard et al. |
| 2009/0252463 A1 | 10/2009 | Stoesz et al. |
| 2009/0252464 A1 | 10/2009 | Stoesz et al. |
| 2009/0254280 A1 | 10/2009 | Stoesz |
| 2011/0058778 A1 | 3/2011 | Herbst |
| 2011/0112410 A1 | 5/2011 | Hirota |
| 2011/0229099 A1 | 9/2011 | Hartog et al. |
| 2013/0051739 A1 | 2/2013 | Stoesz et al. |
| 2013/0094798 A1 | 4/2013 | Duncan et al. |
| 2013/0094812 A1 | 4/2013 | Stoesz |
| 2014/0056553 A1* | 2/2014 | Villiger ............ G02B 6/4407 385/12 |
| 2014/0153884 A1 | 6/2014 | Stoesz |
| 2015/0125117 A1 | 5/2015 | Stoesz et al. |

FOREIGN PATENT DOCUMENTS

| | | |
|---|---|---|
| WO | 2012122336 A1 | 9/2012 |
| WO | 2012178143 A1 | 12/2012 |

OTHER PUBLICATIONS

Dana DuToit et al., "Distributed Fiber Optic Strain and Temperature Sensor forSubsea Umbilical"; International Offshore and Polar Engineering Conference; Jun. 17, 2012; 7 pages.

J.R. Gage et al., "Fiber optic strain and temperature monitoring in crystalline rock at theSanford Underground Science and Engineering Laboratory (SUSEL), Lead, South Dakota"; American Rock Mechanics Association; ARMA 10-367; Jun. 27, 2010; 8 pages.

Notification of Transmittal of the International Search Report and the Written Opinion of the International Searching Authority; PCT/US2014/059000; Korean Intellectual Property Office; Mailed Jan. 15, 2015; ISR 6 pages; WO 5 pages.

Notification of Transmittal of the International Search Report and the Written Opinion of the International Searching Authority; PCT/US2014/059004; Korean Intellectual Property Office; Mailed Jan. 9, 2015; 10 pages.

Notification of Transmittal of the International Search Report and the Written Opinion; PCT/US2013/067249; Korean Intellectual Property Office; Dated Feb. 18, 2014; ISR 3 pages; WO 5 pages.

Xihao, et al., "Strain Transfer Capability of Strain Sensing Optical Fiber Cableand Its Measurement Method", International Wire & Cable Symposium, Proceedings of the 57th IWCS, Nov. 9-12, 2008, Rhode Island Convention Center, Providence, Rhode Isl.

Yokosuka, et al., "A Low Loss Multifiber Connecter and its Applications", Electronic Components and Technology conference, May 20, 1990-May 23, 1990, Las Vegas, NV, pp. 865-868, vol. 1.

* cited by examiner

FIBER OPTIC CABLE ARRANGEMENT

BACKGROUND

Optical fibers can be used to monitor strain in a tool or in a pipe or casing, such as in an oil well, for example. To do so the optical fiber is attached to a length of the tool or structure for which the strain is to be measured. Accuracy and reliability require that the optical fiber be attached to the structure over the span for which measurements will be taken. Because of their fragility, however, optical fibers are typically housed within one or more protective sheaths, within what is referred to as an optical fiber cable. Systems and methods for attaching the fiber to the sheaths and all sheaths together such that strain is reliably transmitted therebetween are of interest to those practicing in the art. Furthermore, most mechanical systems are designed to operate in the linear region for the materials used in their design. This can be referred to as their elastic limit. Typically, forces that extend materials beyond their elastic limit result in system failures. Therefore designs typically maintain a margin of safety to prevent operation beyond the elastic limit. For systems in oil wells, due to geological and operational causes, this elastic limit is commonly exceeded and can eventually lead to well failure. It is desirable for a strain sensing fiber operating in this system to be able to measure the deformation of the structure beyond the elastic limit of the materials in order to monitor system health and potential failure. The oil well environment is harsh for other reasons, e.g. high temperature, high pressure, and corrosive chemicals. Embodiments of fiber optic cable arrangements disclosed herein are employable in measurement systems that can operate in excess of the elastic limits of its materials while providing a useful strain measurement in a harsh oil well environment.

BRIEF DESCRIPTION

Disclosed herein is a fiber optic cable arrangement. The arrangement includes a core, a sheath surrounding the core and being strain locked to the core, and at least one optical fiber positioned within the sheath being strain locked to the core.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method is presented herein by way of exemplification and not limitation with reference to the Figures.

In downhole structures, large geological forces can deform completions and lead to well failures with significant economic impact. Monitoring strains and deformations of a completion can provide reservoir engineers timely information to plan interventions. While strain alone is useful, the shape of a well structure, for example, a casing, is also useful to determine if a work string providing a necessary intervention can be deployed in the deformed wellbore. Whether a sensing cable is being bent or only stretched or compressed axially can indicate the types of forces acting on the well and the type of intervention that is most appropriate. Hence, the embodiments of cable arrangements disclosed herein have an optical fiber that is helically wrapped to provide shape information as well as strain. It should be recognized however that the principles disclosed also apply to embodiments of cable arrangements with straight optical fibers or combinations of straight and helically oriented fibers.

The practical difficulties of providing an optical fiber arranged in a cable for shape sensing and efficient strain transfer over a large strain range in a harsh environment are numerous. Embodiments of cable arrangements disclosed herein address these difficulties.

Figure 1:
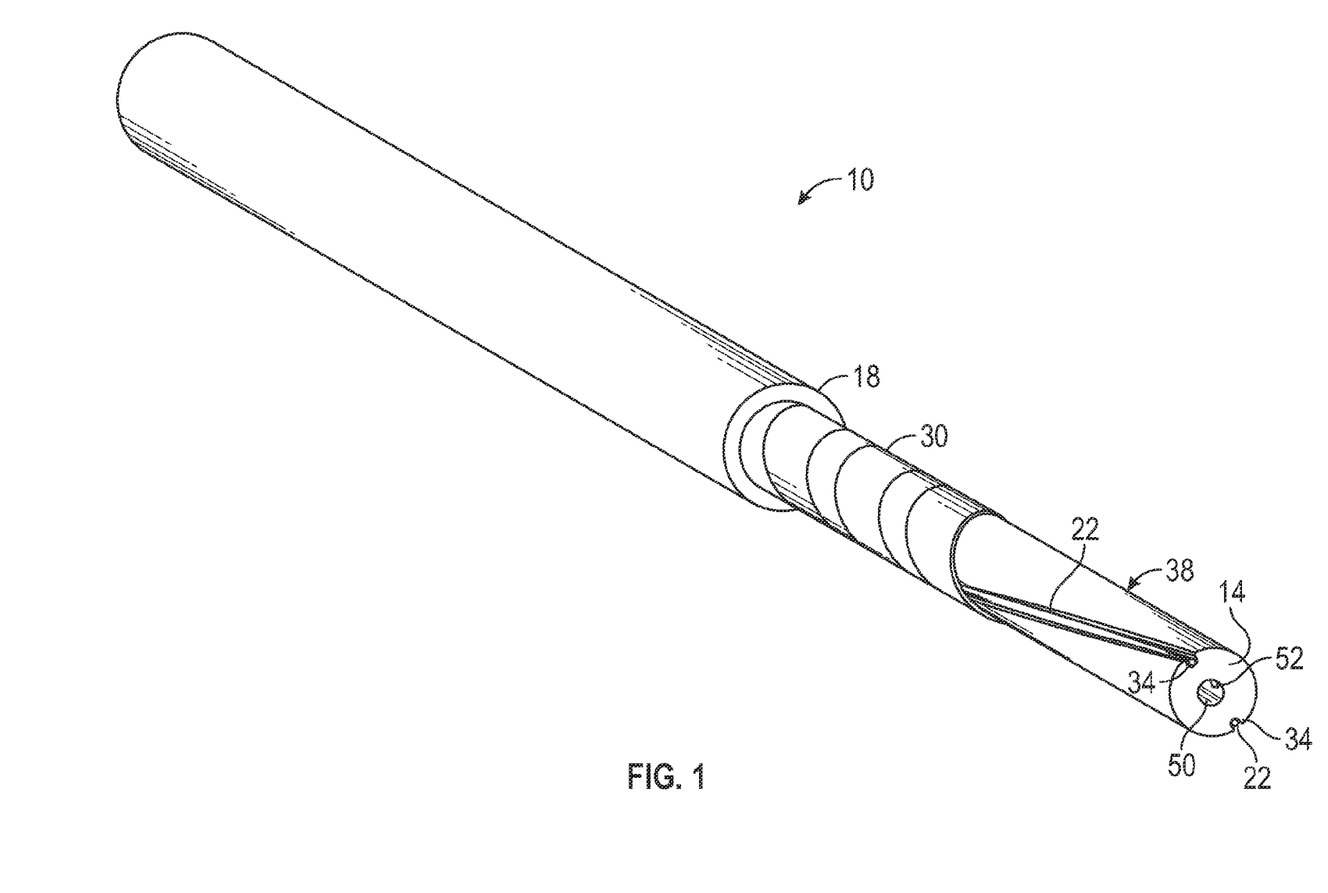
FIG. 1 depicts a partial perspective view of a fiber optic cable arrangement disclosed herein with a portion of the sheath and adhesive removed.
Figure 2:
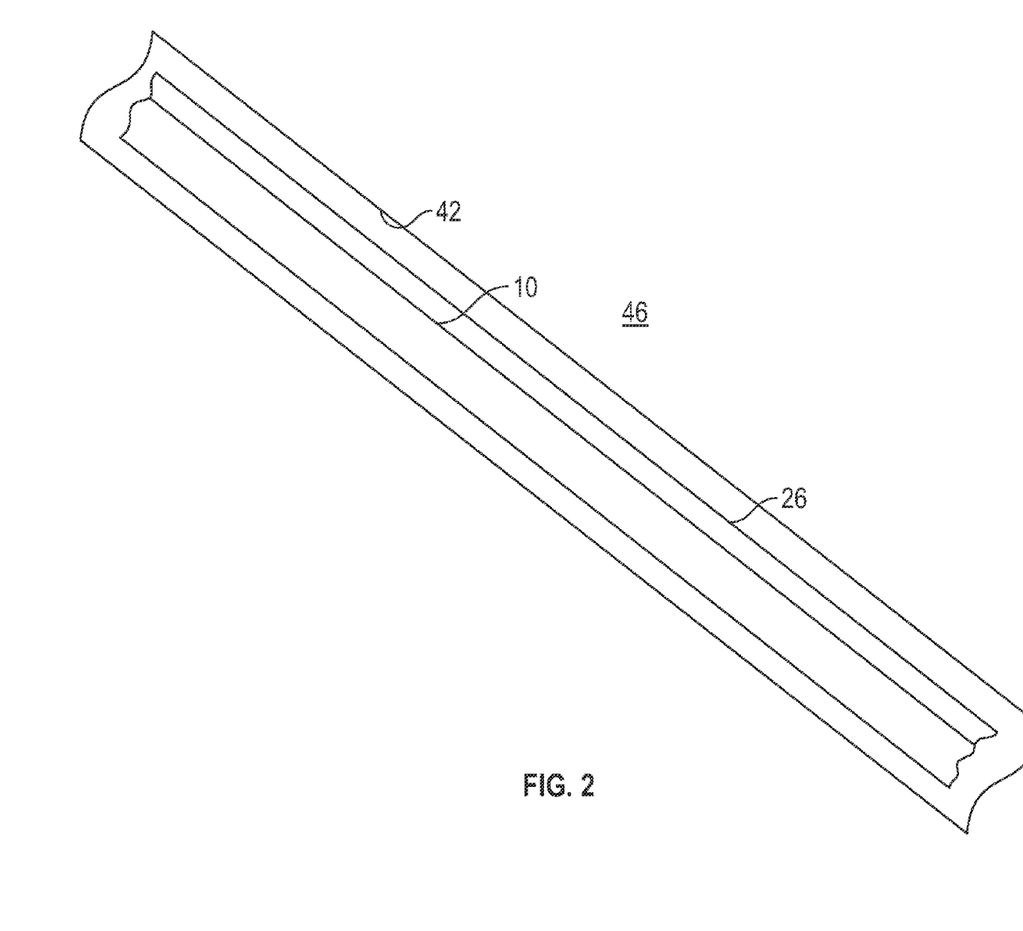
FIG. 2 depicts a side schematic view of the fiber optic cable arrangement of FIG. 1 attached to a structure to be monitored within an earth formation borehole.
Figure 4:
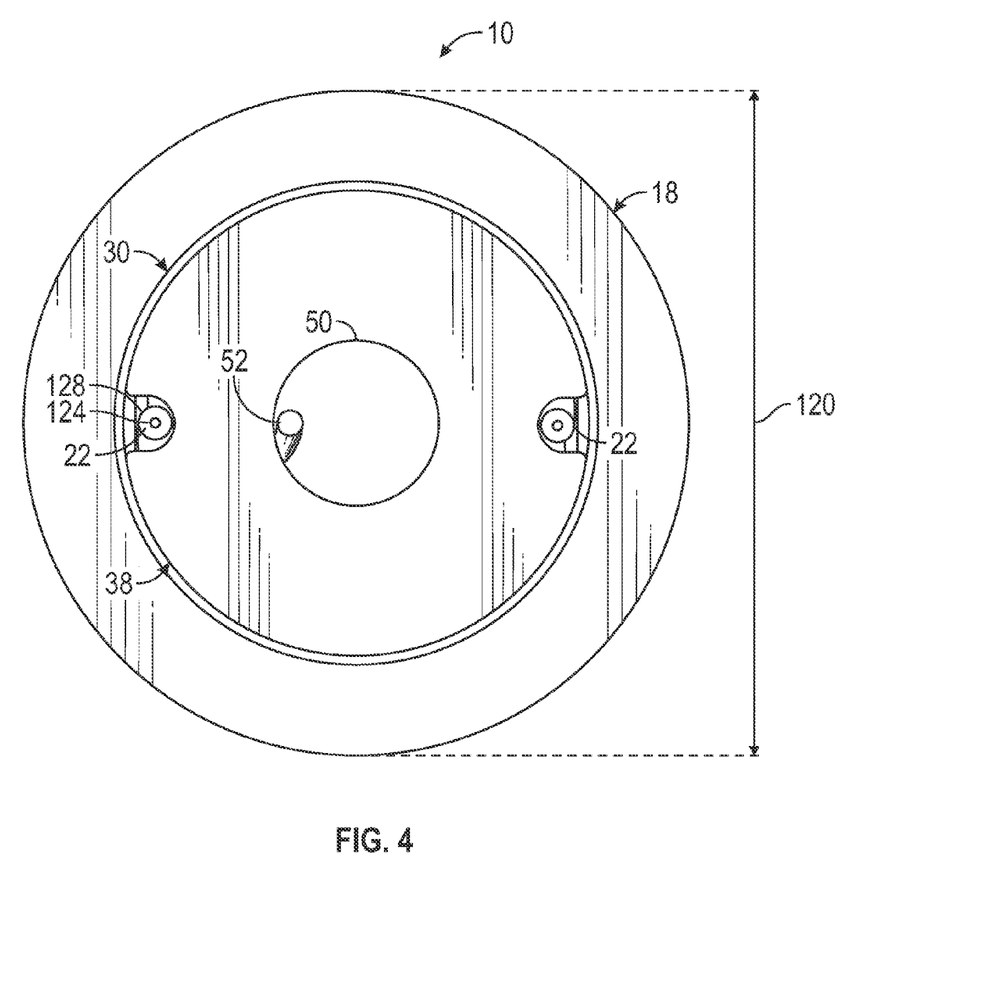
FIG. 4 depicts a cross sectional view of the fiber optic cable arrangement of FIG. 1.

Referring to FIGS. 1, 2 and 4, an embodiment of a fiber optic cable arrangement disclosed herein is illustrated at 10. The fiber optic cable arrangement 10 includes, a core 14, a sheath 18 surrounding the core 14, and at least one optical fiber 22 (with two being shown) positioned within the sheath 18. The core 14 is strain locked to the sheath 18 and the optical fibers 22 are strain locked at least to the core 14. The optical fibers 22 can also be strain locked to the sheath 18.

The embodiment described affixes the optical fiber 22 along a particular path within the cable arrangement 10 and assures that the fiber 22 will respond to externally-induced deformations of the cable arrangement 10 imparted directly to the sheath 18. The shape of the core 14 is used to achieve the placement, in this example, of a helical fiber path. The ability of the arrangement 10 to perform appropriately under large strains that exceed the elastic limits of the materials employed, in a harsh environment, is determined by the appropriate selection of materials and their relative strengths.

Figure 5:
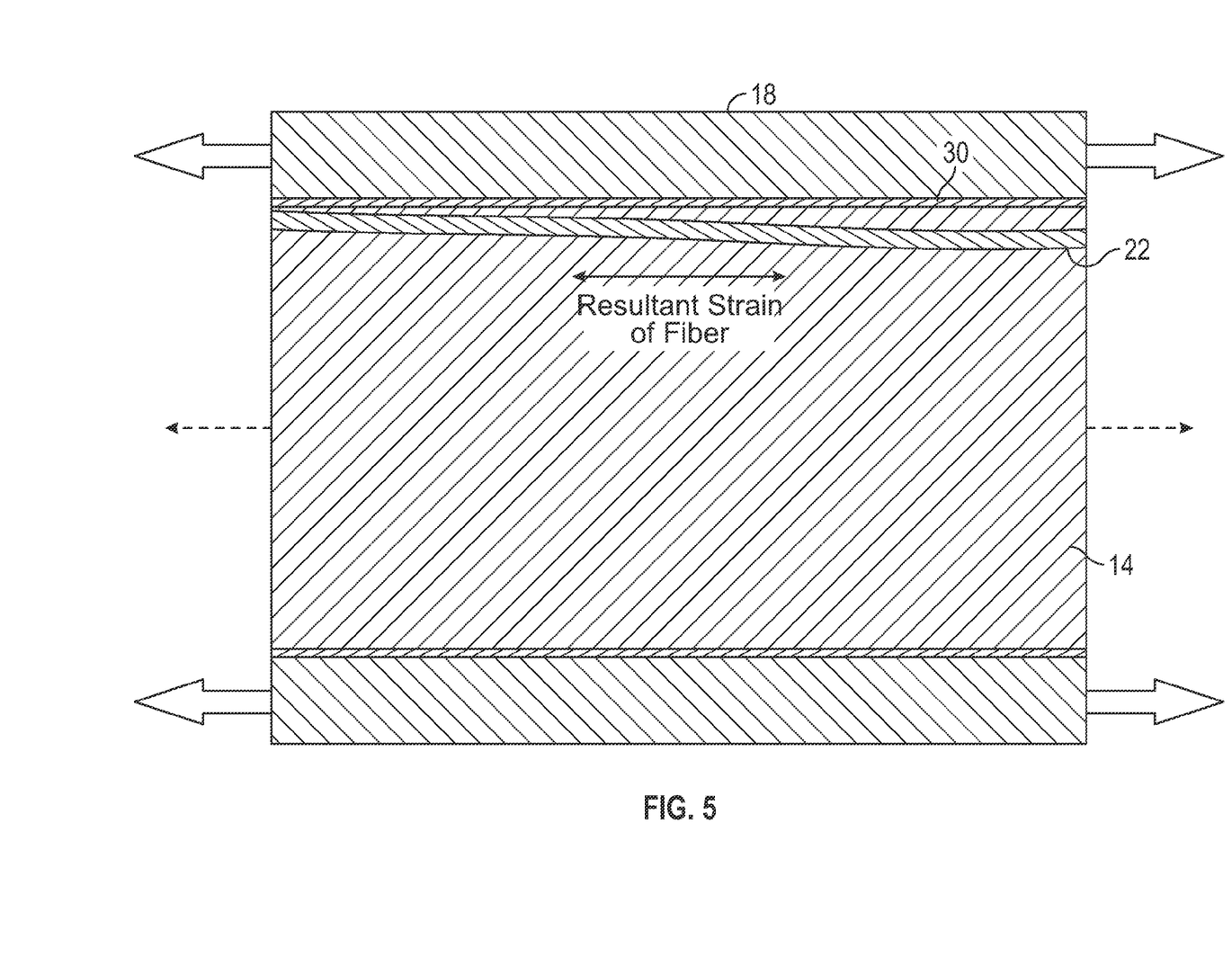
FIG. 5 depicts a cross sectional view of the fiber optic cable arrangement of FIG. 1 with the core concentric with the sheath.

A tensile strength of the sheath 18 is greater than a tensile strength of the core 14. This is a needed for the arrangement 10 to function properly beyond the elastic regime but is also advantageous for operation in the linear regime. A preferred set up for the transfer of strain within the arrangement 10 is depicted by the cross-sectional view of FIG. 5. The direct interaction of the cable arrangement 10 with a structure 26 (FIG. 2 only), tool or environment to be sensed, is provided by contact with the sheath 18, which is strained by external forces applied thereto. The structure 26 is the apparatus within which strain is to be measured and may be one of a casing, a liner, a downhole tool or other structure, for example. The arrangement 10 needs to provide for the transfer of strain to the core 14 and to the fiber 22 attached to the core 14 (depicted as slightly angled in FIG. 5). If the core 14 were selected with a higher tensile strength, the sheath 18 would yield at a strain level lower than the core 14. Additional deformation of the sheath 18 beyond this strain level would not be transmitted to the core 14 but instead would result in continued deformation of the sheath 18 and potential failure of the bond between the sheath 18 and the core 14. Selecting materials such that the tensile strength of the sheath 18 is greater than the tensile strength of the core 14 assures that deformation of the sheath 18, which corresponds with deformation of the tool 26 or structure is transmitted faithfully to the fiber 22 inside the cable arrangement 10. The foregoing results in the fiber optic cable arrangement 10 being more sensitive to measuring strain experienced by the tool 26 because deformation of the core 14 occurs readily.

An adhesive 30, such as epoxy for example, in the form of a tape in this embodiment, is employed to strain transmissively adhere the core 14 to the sheath 18 thereby strain locking the core 14 to the sheath 18. The adhesive 30 is wrapped around the core 14 prior to being positioned within the sheath 18. Alternatively, the adhesive 30 could be positioned directly between the fiber 22 and the core 14. The adhesive 30 may also bond the optical fibers 22 to the sheath 18 although it is not required. Since adhesion between the optical fibers 22 and the core 14 is required the adhesive 30, if wrapped around the core 14 and over the fiber 22, should be configured to readily flow around the optical fibers 22 between the optical fibers 22 and the core 14 to assure adherence between the optical fibers 22 and the core 14. One skilled in the use of adhesives will realize that the placement of the adhesive 30 initially does not determine where it finally bonds and is cured. Many adhesives readily flow before final curing. One can easily determine whether the adhesive 30 is directly bonding the fiber 22 to the core 14 in the final cable arrangement 10 by removing the sheath 18 and determining if the fiber 22 can then be easily removed from the core 14. In some embodiments the adhesive 30 might be in liquid form or a separate adhesive may be employed specifically to strain lock the optical fibers 22 to the core 14. The details of how the arrangement 10 is most advantageously constructed and the adhesive 30 most advantageously applied may determine the specific choices of adhesive and construction methods employed.

Figure 6:
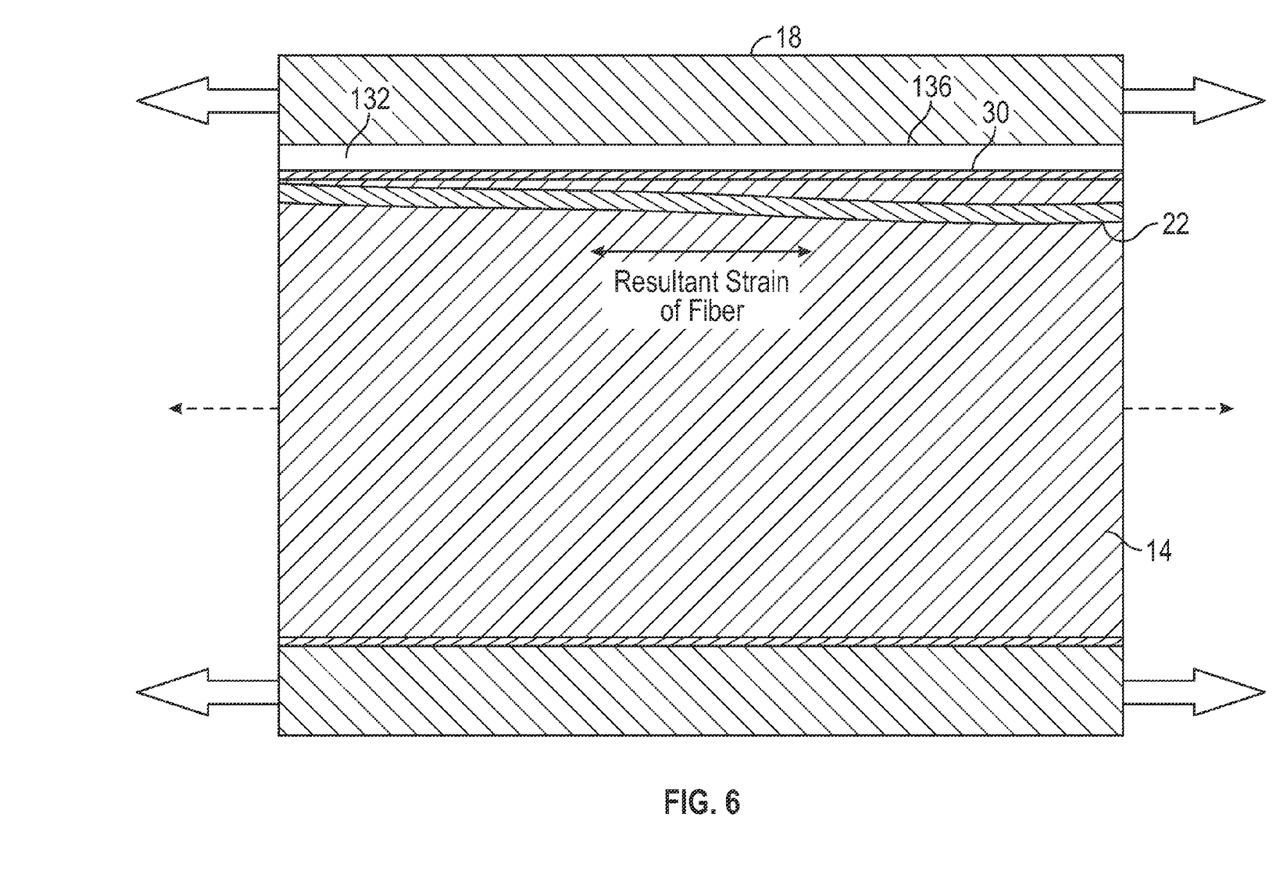
FIG. 6 depicts a cross sectional view of the fiber optic cable arrangement of FIG. 1 with the core off center relative to the sheath.
Figure 7:
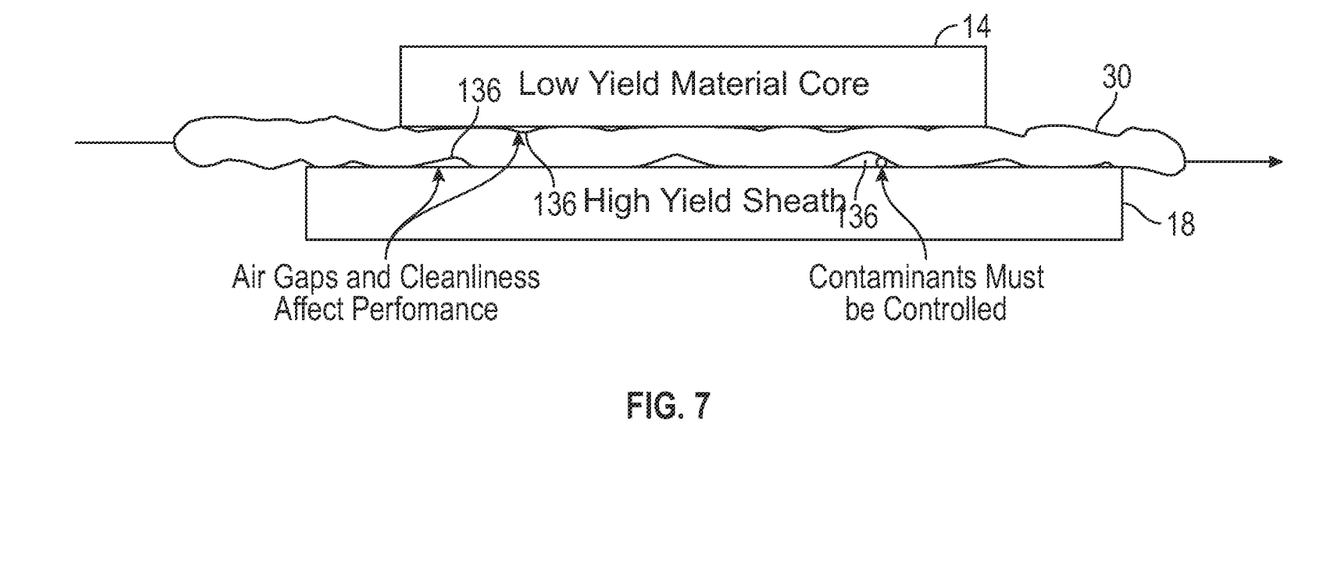
FIG. 7 depicts a partial cross sectional view of adhesive between the core and the sheath in a fiber optic cable arrangement disclosed herein.

In one embodiment of the arrangement 10, the core yield strength needed is determined by the adhesive properties and the sheath yield strength. However, in other embodiments of the cable arrangement 10, many factors have impact on the needed yield strength. FIGS. 6 and 7 illustrate a few factors. In FIG. 6 is shown the cable arrangement 10 with the core 14 off center (eccentric) from the sheath 18 with the adhesive 30 only partially filling a space 132 between the sheath 18 and the core 14. Practically it is found that centering the core 14 may be difficult to achieve during the process of applying the sheath 18 to the core 14. Fully filling the space 132 inside the cable arrangement 10 with the adhesive 30 is generally rather difficult within the constraints of the sheathing process. The core 14 being offcenter in the illustrated example generates a moment that would tend to bend the core 14 if not well adhered in adequate regions to the sheath 18. Furthermore, as in FIG. 7, air gaps 136 may occur or contaminants may be introduced in the process of building the cable arrangement 10 and may reduce the performance of the adhesive 30. Yet, regardless of the constraints, it is required that the cable arrangement 10 transfer strain from the sheath 18 to the fiber 22, even in regions where there is no adhesive 30 between the fiber 22 and the sheath 18 or the adhesion is less than perfectly attached. As an example, if only ½ of the core-to-cladding interface is filled with the adhesive 30, then that reduced amount of adhesive should still be configured to transfer strain from the sheath 18 to the core 14. Reducing the tensile strength of the core 14 even further relative to the tensile strength of the sheath 18 can compensate for such a non-ideal situation. As mentioned, the embodiment of FIG. 1 includes two of the optical fibers 22 although a single one of the optical fibers 22 or more than two could be employed in other embodiments. The optical fibers 22 in this embodiment are positioned within grooves 34 formed in an outer surface 38 of the core 14, other embodiments may not include the grooves 34. The grooves 34 in the core 14 simplify assembly of the fiber optic cable arrangement 10 by locating the optical fibers 22 while the sheath 18 is being positioned around the core 14, the optical fibers 22 and the adhesive 30. The grooves 34 can be sized such that the optical fibers 22 are radially loaded between the sheath 18 and the core 14, while in other embodiments the grooves 34 can be sized to allow clearance between the optical fibers 22 and the sheath 18. Some embodiments may not employ the adhesive 30 between the core 14 and the sheath 18 which is fine as long as the core 14 and the sheath 18 are strain locked to one another. Such strain locking could be achieved by other means including mechanically loading therebetween such as by radially compressing the core 14 within the sheath 18.

Positioning the optical fibers 22 in a helical orientation relative to the sheath 18, as illustrated, provides greater sensitivity to bending of the cable arrangement 10 when compared to embodiments wherein the optical fibers are oriented in a straight (non-helical) orientation, although both embodiments fall within the scope of the claims included herein. Configuring the grooves 34 in a helical fashion on the outer surface 38 of the core 14 in addition to simplifying assembly of the cable arrangement 10 also maintains a pitch defined by the helical orientation. Knowing the pitch of the helical orientation aids determining a direction of non-axial (i.e. bending) strain in the cable arrangement 10. Orienting the optical fibers 22 in a helical fashion within the sheath 18 allows the cable arrangement 10 to be oriented straight relative to the tool 26 while still allowing interrogation therealong to determine bending strain in the tool 26. Thus the cable arrangement 10 allows similar results as that achieved by an optical fiber that is helically wound relative to the tool 26 directly. However, it is often simpler and more cost effective to attach the cable arrangement 10 straight along the tool 26 than in the conventional manner of helically attaching an optical cable.

Material choice for the core 14 and the sheath 18 can be influenced by the environment in which the cable arrangement 10 is to be employed. In a downhole application such as within a borehole 42 in an earth formation 46 (FIG. 2) such as in the hydrocarbon recovery or carbon dioxide sequestration industries, for example, high pressures, high temperatures and caustic fluids may be expected. The sheath 18 in such applications should be made of materials that are able to withstand these harsh conditions. As such, stainless steel and Inconel® are good choices for usage in the sheath 18. The core 14, is somewhat protected from the environment wherein the cable 10 is employed since the sheath 18 sealingly surrounds the core 14. As such, the core 14 can be made of materials including copper, aluminum, polymers, and combinations of these materials, for example, when the cable arrangement is deployed in the same environment. Selection of these materials makes the requirement that the tensile strength of the sheath 18 be greater than the tensile strength of the core 14 achievable since stainless steels and Inconel® have tensile strengths that range about 100,000-150,000 psi, while copper, aluminum and appropriate polymers have tensile strengths in the range of about 5,000-20,000 psi. The foregoing materials make selecting the sheath 18 with about 5-20 times the tensile strength of the core 14 readily possible.

This allows for the material selection to accommodate the non-ideal situations encountered when practically building the cable arrangement 10, as described above. Furthermore, in embodiments that bond the core 14 to the sheath 18 with the adhesive 30, the shear strength of the adhesive 30 must be greater than the tensile strength of the core 14. Epoxies, for example, can have tensile strength of 10,000-15,000 psi. The adhesive 30 should also be selected based on its ability to perform over the temperature range expected in the environment where it will be deployed and also for being able to achieve excellent adhesion to the fiber 22 and the core 14, and the sheath 18 (if used to bond to that as well).

The core 14 of the embodiment of FIG. 1 can optionally include a through bore 50 through the center thereof. The through bore 50 can serve as a conduit through which fluid or pressure may be supplied. Alternatively, a control line 52 such as an optical communication line, a fluid conduit or an electrical conductor could be run through the through bore 50.

Figure 3:
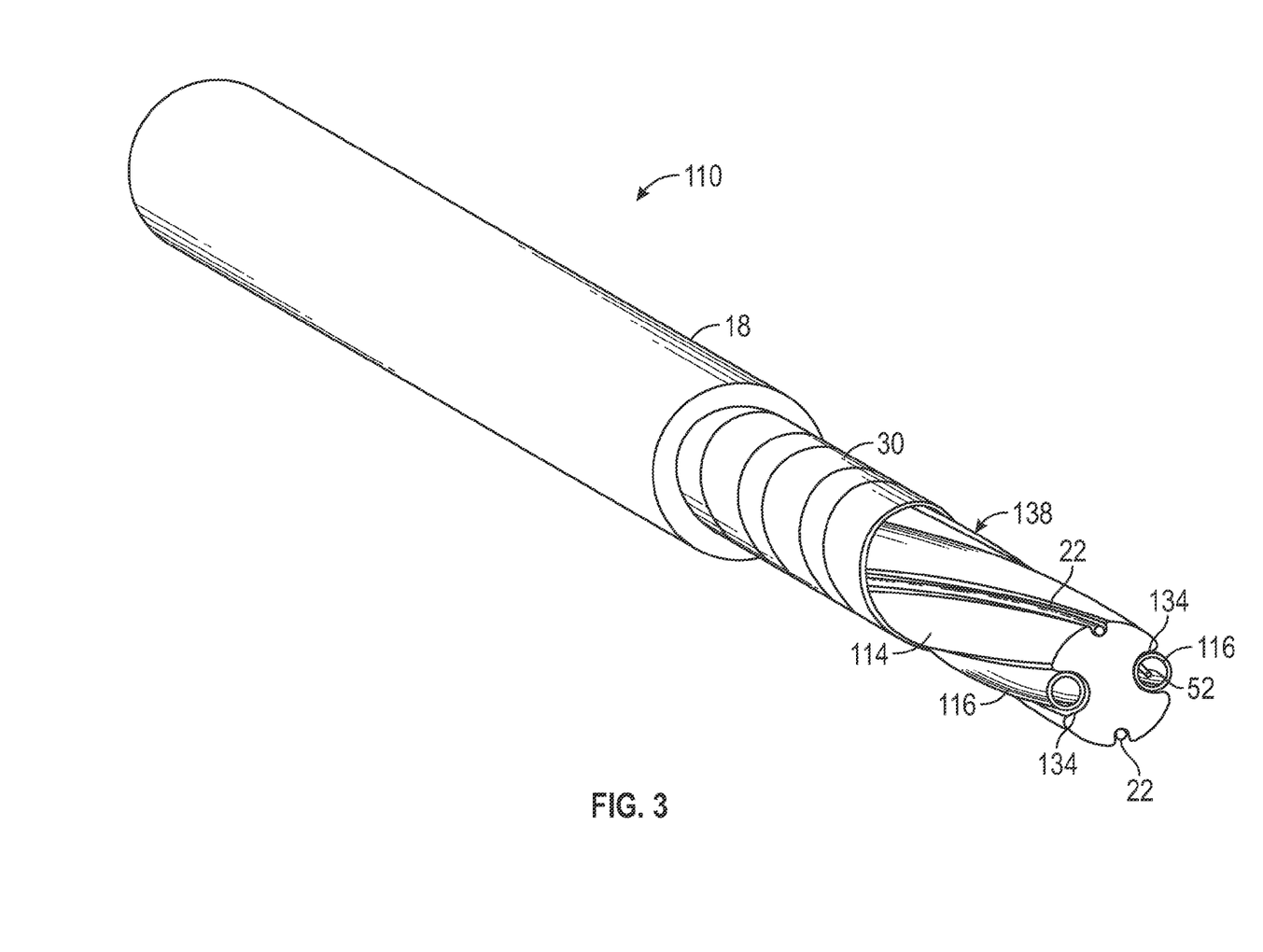
FIG. 3 depicts a partial perspective view of an alternate fiber optic cable arrangement disclosed herein with a portion of the sheath and adhesive removed.

Referring to FIG. 3, an alternate embodiment of a fiber optic cable arrangement disclosed herein is illustrated at 110. The cable arrangement 110 is similar to the cable arrangement 10 in many ways. As such, like elements will be referred to with the same reference characters and primarily only the differences between the arrangements 10 and 110 will be discussed hereunder. The cable arrangement 110, in addition to the optical fibers 22 includes two tubes 116. The tubes 116 are positioned within grooves 134 in an outer surface 138 of a core 114. The adhesive 30 is employed to strain lock the core 114 to the sheath 18. The tubes 116 may also be strain locked to the sheath 18. Regardless of whether the tubes 116 are strain locked to the sheath 18 the material of both the tubes 116 and the core 114 have a lower tensile strength than the material of the sheath 18. As with the through bore 50 of the arrangement 10 the tubes 116 of the arrangement 110 can serve as conduits through which fluid or pressure may be supplied or the control lines 52 routed. Alternatively, the tubes 116 themselves can be control lines, such as communication lines that are optical or electrical in nature, for example.

The fiber optic cable arrangement 10 is configured to perform appropriately under large strains which exceed the elastic limits of the materials employed while in a harsh environment. The relative strength of the core 14, the sheath 18 and the adhesive 30 allow for shear forces that can be tolerated by the adhesive 30 without debonding.

Referring to FIG. 4 specifically, dimensions of an embodiment of the cable arrangement 10 are provided as an example. An outer diameter 120 of the sheath 18 is shown as 0.25 inches, while other sizes are possible. An embodiment of the optical fibers 22 is made of glass 124 with a polymer coating 128, but other materials or coatings may be used to make optical fibers 22. An outer diameter of the glass is shown as 0.005 inches.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A fiber optic cable arrangement, comprising:
a core;
a sheath surrounding the core and being strain locked to the core; and
at least one optical fiber positioned within the sheath being strain locked to the core.

2. The fiber optic cable arrangement of claim 1, further comprising an adhesive that adheres the at least one optical fiber to the core.

3. The fiber optic cable arrangement of claim 1, wherein the at least one optical fiber is adhered to the sheath and the core.

4. The fiber optic cable arrangement of claim 1, wherein the at least one optical fiber is positioned in a helical orientation relative to the core.

5. The fiber optic cable arrangement of claim 1, wherein the at least one optical fiber is positioned within a groove in the core.

6. The fiber optic cable arrangement of claim 1, wherein the sheath is Inconel® or stainless steel.

7. The fiber optic cable arrangement of claim 1, wherein the core is selected from the group consisting of copper, aluminum, polymers, and combinations of these materials.

8. The fiber optic cable arrangement of claim 1, further comprising at least one additional member within the sheath.

9. The fiber optic cable arrangement of claim 8, wherein the at least one additional member is not strain locked to the sheath or the core.

10. The fiber optic cable arrangement of claim 8, wherein the at least one additional member has a tensile strength less than a tensile strength of the sheath.

11. The fiber optic cable arrangement of claim 1, wherein tensile strength of the sheath is greater than tensile strength of the core.

12. The fiber optic cable arrangement of claim 11, wherein the tensile strength of the sheath is about five to ten times greater than the tensile strength of the core.

13. The fiber optic cable arrangement of claim 11, wherein tensile strength of an adhesive is greater than the tensile strength of the core.

14. The fiber optic cable arrangement of claim 11, wherein tensile strength of an adhesive is less than the tensile strength of the sheath.

15. The fiber optic cable arrangement of claim 1, wherein the at least one optical fiber is positioned eccentric relative to the sheath.

* * * * *